US011363536B2

(12) United States Patent
Zacharias et al.

(10) Patent No.: US 11,363,536 B2
(45) Date of Patent: Jun. 14, 2022

(54) INTERMODULATION MITIGATION FOR INTER-RADIO ACCESS TECHNOLOGY (RAT) COMMUNICATIONS

(71) Applicant: QUALCOMM Incorporated, San Diego, CA (US)

(72) Inventors: Leena Zacharias, San Jose, CA (US); Reza Shahidi, San Diego, CA (US); Carlos Cabrera Mercader, Cardiff, CA (US); Amir Aminzadeh Gohari, Sunnyvale, CA (US); Arnaud Meylan, San Diego, CA (US); Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 16/949,095

(22) Filed: Oct. 13, 2020

(65) Prior Publication Data

US 2021/0120501 A1    Apr. 22, 2021

Related U.S. Application Data

(60) Provisional application No. 62/923,240, filed on Oct. 18, 2019.

(51) Int. Cl.
*H04W 52/24* (2009.01)
*H04W 52/36* (2009.01)
*H04W 76/15* (2018.01)

(52) U.S. Cl.
CPC ....... *H04W 52/243* (2013.01); *H04W 52/365* (2013.01); *H04W 76/15* (2018.02)

(58) Field of Classification Search
CPC ........... H04W 52/243; H04W 72/1215; H04W 52/365

(Continued)

(56) References Cited

U.S. PATENT DOCUMENTS

2013/0250871 A1* 9/2013 Kaukovuori ........ H04W 72/082
370/329
2019/0081657 A1* 3/2019 Zeng ................. H04W 72/0453
(Continued)

OTHER PUBLICATIONS

International Search Report and Written Opinion—PCT/US2020/070668—ISA/EPO—dated Mar. 24, 2021.
(Continued)

*Primary Examiner* — John J Lee
(74) *Attorney, Agent, or Firm* — Dalei Dong; Harrity & Harrity, LLP

(57) ABSTRACT

This disclosure provides systems, methods and apparatuses for user equipment (UE)-side and network-side mitigation of intermodulation (IM) interference, such as IM interference associated with multi-radio access technology communications. For example, the UE or a base station may detect an IM interference condition, and may perform an IM mitigation action based on detecting the IM interference condition. The UE may reduce an uplink transmit power so that IM interference on the downlink is reduced. Various base station IM mitigation actions are provided, such as suspending scheduling on a bearer, using a scheduling pattern that avoids concurrent transmission, reducing a maximum transmit power of an uplink grant of the UE, allocating resource blocks or bandwidth parts that do not overlap with an IM interference resource, changing a secondary cell group channel to a non-interfering channel, releasing a secondary cell group channel, deactivating a carrier, or changing a channel of the UE.

30 Claims, 8 Drawing Sheets

(58) Field of Classification Search
USPC ... 455/452.1, 509, 63.1, 501, 67.13, 522, 69
See application file for complete search history.

(56) References Cited

U.S. PATENT DOCUMENTS

2019/0082337 A1* 3/2019 Gheorghiu ........... H04B 17/318
2020/0275326 A1* 8/2020 Ma ....................... H04W 76/30

OTHER PUBLICATIONS

Partial International Search Report—PCT/US2020/070668—ISA/EPO—dated Jan. 29, 2021.

\* cited by examiner

INTERMODULATION MITIGATION FOR INTER-RADIO ACCESS TECHNOLOGY (RAT) COMMUNICATIONS

CROSS-REFERENCE TO RELATED APPLICATION

This Patent Application claims priority to U.S. Provisional Patent Application No. 62/923,240, filed on Oct. 18, 2019, entitled "INTERMODULATION MITIGATION FOR INTER-RADIO ACCESS TECHNOLOGY (RAT) COMMUNICATIONS," and assigned to the assignee hereof. The disclosure of the prior Application is considered part of and is incorporated by reference into this Patent Application.

TECHNICAL FIELD

Aspects of the present disclosure relate generally to wireless communication and more particularly to intermodulation (IM) mitigation techniques for inter-radio access technology (RAT) communications.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, a 5G NodeB, or the like.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include determining that an intermodulation (IM) interference condition is satisfied for an uplink transmission, where the IM interference condition is based on: a desense threshold for a transmit power of the uplink transmission being satisfied, and a downlink reception occurring concurrently with the uplink transmission; and reducing the transmit power of the uplink transmission based on the IM interference condition being satisfied.

In some implementations, the transmit power is reduced by a value configured so that the desense threshold is no longer satisfied after the transmit power is reduced.

In some implementations, the uplink transmission is a dual connectivity transmission on at least two radio access technologies (RATs).

In some implementations, the at least two RATs include New Radio (NR) and Long Term Evolution (LTE).

In some implementations, the downlink reception is associated with LTE.

In some implementations, reducing the transmit power of the uplink transmission further includes reducing an NR transmit power of the uplink transmission.

In some implementations, reducing the transmit power of the uplink transmission further includes reducing an LTE transmit power of the uplink transmission.

In some implementations, the downlink reception is associated with NR.

In some implementations, the uplink transmission is a carrier aggregation transmission associated with a single radio access technology.

In some implementations, the uplink transmission is a dual connectivity transmission associated with a single radio access technology.

In some implementations, determining that the IM interference condition is satisfied is based on an average reception power of the downlink reception for a time period.

In some implementations, determining that the IM interference condition is satisfied is based on an instantaneous reception power of the downlink reception.

In some implementations, the downlink reception is associated with a Voice over Long Term Evolution (VoLTE) call.

In some implementations, the downlink reception is assumed to be occurring concurrently with the uplink transmission.

In some implementations, the downlink reception is determined to be occurring concurrently with the uplink transmission based on scheduling information.

In some implementations, determining that the IM interference condition is satisfied is based on a band combination or channel combination of the UE being associated with IM interference.

In some implementations, determining that the IM interference condition is satisfied is based on an IM interference power associated with the IM interference that is determined from the uplink transmit power.

In some implementations, the IM interference power is determined based on a model that is trained based on measurements or simulations of IM interference.

In some implementations, determining that the IM interference condition is satisfied is based on a Voice over Long Term Evolution (VoLTE) call being active.

In some implementations, determining that the IM interference condition is satisfied is based on an uplink frequency resource allocation of the UE.

In some implementations, the transmit power is reduced without modifying a reported power headroom of the UE.

In some implementations, reducing the transmit power further includes modifying a reported power headroom of the UE.

In some implementations, the desense threshold identifies a threshold sensitivity degradation for the downlink reception.

Another innovative aspect of the subject matter described in this disclosure can be implemented in an apparatus of a UE for wireless communication. The UE may include a processing system configured to determine that an IM interference condition is satisfied for an uplink transmission, where the IM interference condition is based on: a desense threshold for a transmit power of the uplink transmission being satisfied, and a downlink reception occurring concurrently with the uplink transmission. The processing system may be configured to reduce the transmit power of the uplink transmission based on the IM interference condition being satisfied.

In some implementations, the transmit power is reduced by a value configured so that the desense threshold is no longer satisfied after the transmit power is reduced.

In some implementations, the uplink transmission is a dual connectivity transmission on at least two radio access technologies (RATs).

In some implementations, the at least two RATs include New Radio (NR) and Long Term Evolution (LTE).

In some implementations, the downlink reception is associated with LTE.

In some implementations, reducing the transmit power of the uplink transmission further includes reducing an NR transmit power of the uplink transmission.

In some implementations, the processing system may be configured to reduce an LTE transmit power of the uplink transmission.

In some implementations, the downlink reception is associated with NR.

In some implementations, the uplink transmission is a carrier aggregation transmission associated with a single radio access technology.

In some implementations, the uplink transmission is a dual connectivity transmission associated with a single radio access technology.

In some implementations, determining that the IM interference condition is satisfied is based on an average reception power of the downlink reception for a time period.

In some implementations, determining that the IM interference condition is satisfied is based on an instantaneous reception power of the downlink reception.

In some implementations, the downlink reception is associated with a Voice over Long Term Evolution (VoLTE) call.

In some implementations, the downlink reception is assumed to be occurring concurrently with the uplink transmission.

In some implementations, the downlink reception is determined to be occurring concurrently with the uplink transmission based on scheduling information.

In some implementations, determining that the IM interference condition is satisfied is based on a band combination or channel combination of the UE being associated with IM interference.

In some implementations, determining that the IM interference condition is satisfied is based on an IM interference power associated with the IM interference that is determined from the uplink transmit power.

In some implementations, the IM interference power is determined based on a model that is trained based on measurements or simulations of IM interference.

In some implementations, determining that the IM interference condition is satisfied is based on a Voice over Long Term Evolution (VoLTE) call being active.

In some implementations, determining that the IM interference condition is satisfied is based on an uplink frequency resource allocation of the UE.

In some implementations, the transmit power is reduced without modifying a reported power headroom of the UE.

In some implementations, reducing the transmit power further includes modifying a reported power headroom of the UE.

In some implementations, the desense threshold identifies a threshold sensitivity degradation for the downlink reception.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to determine that an IM interference condition is satisfied for an uplink transmission, where the IM interference condition is based on: a desense threshold for a transmit power of the uplink transmission being satisfied, and a downlink reception occurring concurrently with the uplink transmission; and reduce the transmit power of the uplink transmission based on the IM interference condition being satisfied.

In some implementations, the transmit power is reduced by a value configured so that the desense threshold is no longer satisfied after the transmit power is reduced.

In some implementations, the uplink transmission is a dual connectivity transmission on at least two radio access technologies (RATs).

In some implementations, the at least two RATs include New Radio (NR) and Long Term Evolution (LTE).

In some implementations, the downlink reception is associated with LTE.

In some implementations, reducing the transmit power of the uplink transmission further includes reducing an NR transmit power of the uplink transmission.

In some implementations, the one or more instructions, that cause the one or more processors to reduce the transmit power of the uplink transmission, cause the one or more processors to reduce an LTE transmit power of the uplink transmission.

In some implementations, the downlink reception is associated with NR.

In some implementations, the uplink transmission is a carrier aggregation transmission associated with a single radio access technology.

In some implementations, the uplink transmission is a dual connectivity transmission associated with a single radio access technology.

In some implementations, determining that the IM interference condition is satisfied is based on an average reception power of the downlink reception for a time period.

In some implementations, determining that the IM interference condition is satisfied is based on an instantaneous reception power of the downlink reception.

In some implementations, the downlink reception is associated with a Voice over Long Term Evolution (VoLTE) call.

In some implementations, the downlink reception is assumed to be occurring concurrently with the uplink transmission.

In some implementations, the downlink reception is determined to be occurring concurrently with the uplink transmission based on scheduling information.

In some implementations, determining that the IM interference condition is satisfied is based on a band combination or channel combination of the UE being associated with IM interference.

In some implementations, determining that the IM interference condition is satisfied is based on an IM interference power associated with the IM interference that is determined from the uplink transmit power.

In some implementations, the IM interference power is determined based on a model that is trained based on measurements or simulations of IM interference.

In some implementations, determining that the IM interference condition is satisfied is based on a Voice over Long Term Evolution (VoLTE) call being active.

In some implementations, determining that the IM interference condition is satisfied is based on an uplink frequency resource allocation of the UE.

In some implementations, the transmit power is reduced without modifying a reported power headroom of the UE.

In some implementations, reducing the transmit power further includes modifying a reported power headroom of the UE.

In some implementations, the desense threshold identifies a threshold sensitivity degradation for the downlink reception.

Another innovative aspect of the subject matter described in this disclosure can be implemented in an apparatus for wireless communication. The apparatus may include means for determining that an IM interference condition is satisfied for an uplink transmission, where the IM interference condition is based on: a desense threshold for a transmit power of the uplink transmission being satisfied, and a downlink reception occurring concurrently with the uplink transmission; and means for reducing the transmit power of the uplink transmission based on the IM interference condition being satisfied.

In some implementations, the transmit power is reduced by a value configured so that the desense threshold is no longer satisfied after the transmit power is reduced.

In some implementations, the uplink transmission is a dual connectivity transmission on at least two radio access technologies (RATs).

In some implementations, the at least two RATs include New Radio (NR) and Long Term Evolution (LTE).

In some implementations, the downlink reception is associated with LTE.

In some implementations, reducing the transmit power of the uplink transmission further includes reducing an NR transmit power of the uplink transmission.

In some implementations, the means for reducing the transmit power of the uplink transmission further includes means for reducing an LTE transmit power of the uplink transmission.

In some implementations, the downlink reception is associated with NR.

In some implementations, the uplink transmission is a carrier aggregation transmission associated with a single radio access technology.

In some implementations, the uplink transmission is a dual connectivity transmission associated with a single radio access technology.

In some implementations, determining that the IM interference condition is satisfied is based on an average reception power of the downlink reception for a time period.

In some implementations, determining that the IM interference condition is satisfied is based on an instantaneous reception power of the downlink reception.

In some implementations, the downlink reception is associated with a Voice over Long Term Evolution (VoLTE) call.

In some implementations, the downlink reception is assumed to be occurring concurrently with the uplink transmission.

In some implementations, the downlink reception is determined to be occurring concurrently with the uplink transmission based on scheduling information.

In some implementations, determining that the IM interference condition is satisfied is based on a band combination or channel combination of the UE being associated with IM interference.

In some implementations, determining that the IM interference condition is satisfied is based on an IM interference power associated with the IM interference that is determined from the uplink transmit power.

In some implementations, the IM interference power is determined based on a model that is trained based on measurements or simulations of IM interference.

In some implementations, determining that the IM interference condition is satisfied is based on a Voice over Long Term Evolution (VoLTE) call being active.

In some implementations, determining that the IM interference condition is satisfied is based on an uplink frequency resource allocation of the UE.

In some implementations, the transmit power is reduced without modifying a reported power headroom of the UE.

In some implementations, reducing the transmit power further includes modifying a reported power headroom of the UE.

In some implementations, the desense threshold identifies a threshold sensitivity degradation for the downlink reception.

Another innovative aspect of the subject matter described in this disclosure can be implemented in a method of wireless communication performed by an apparatus of a base station (BS). The method may include determining that an IM interference condition is satisfied for a communication with a UE, where the IM interference condition is based on at least one of: a bearer associated with the UE being active, the UE being associated with a band combination or a channel combination that is associated with IM interference, or receiving an indication of IM interference at the UE; and performing an IM mitigation action based on the IM interference condition being satisfied.

In some implementations, the bearer is a voice call bearer.

In some implementations, the IM mitigation action includes suspending downlink and uplink scheduling on a particular bearer of the UE for a radio access technology associated with the bearer.

In some implementations, the IM mitigation action includes scheduling in accordance with a scheduling pattern that is configured to avoid concurrent transmission on a first radio access technology (RAT) and a second RAT associated with the bearer.

In some implementations, scheduling in accordance with the scheduling pattern is based on a downlink error rate of the UE.

In some implementations, scheduling in accordance with the scheduling pattern is based on a discontinuous reception (DRX) pattern of the UE.

In some implementations, the IM mitigation action includes reducing a maximum transmit power of an uplink grant of the UE.

In some implementations, the uplink grant is associated with a first radio access technology (RAT) and the bearer is associated with a second RAT.

In some implementations, the IM mitigation action includes allocating resource blocks or bandwidth parts for the UE that do not overlap with an IM interference resource.

In some implementations, the IM mitigation action includes changing a secondary cell group channel of the UE to a non-interfering channel.

In some implementations, the IM mitigation action includes releasing a secondary cell group channel of the UE while the bearer is active.

In some implementations, the IM mitigation action includes deactivating a carrier of the UE, associated with a different radio access technology than the bearer, while the bearer is active.

In some implementations, the IM mitigation action includes changing a channel of the UE to a non-interfering channel.

Another innovative aspect of the subject matter described in this disclosure can be implemented in an apparatus of a BS for wireless communication. The BS may include a processing system configured to determine that an IM interference condition is satisfied for a communication with a UE, where the IM interference condition is based on at least one of: a bearer associated with the UE being active, the UE being associated with a band combination or a channel combination that is associated with IM interference, or receiving an indication of IM interference at the UE. The processing system may be configured to perform an IM mitigation action based on the IM interference condition being satisfied.

In some implementations, the bearer is a voice call bearer.

In some implementations, the IM mitigation action includes suspending downlink and uplink scheduling on a particular bearer of the UE for a radio access technology associated with the bearer.

In some implementations, the IM mitigation action includes scheduling in accordance with a scheduling pattern that is configured to avoid concurrent transmission on a first radio access technology (RAT) and a second RAT associated with the bearer.

In some implementations, scheduling in accordance with the scheduling pattern is based on a downlink error rate of the UE.

In some implementations, scheduling in accordance with the scheduling pattern is based on a discontinuous reception (DRX) pattern of the UE.

In some implementations, the IM mitigation action includes reducing a maximum transmit power of an uplink grant of the UE.

In some implementations, the uplink grant is associated with a first radio access technology (RAT) and the bearer is associated with a second RAT.

In some implementations, the IM mitigation action includes allocating resource blocks or bandwidth parts for the UE that do not overlap with an IM interference resource.

In some implementations, the IM mitigation action includes changing a secondary cell group channel of the UE to a non-interfering channel.

In some implementations, the IM mitigation action includes releasing a secondary cell group channel of the UE while the bearer is active.

In some implementations, the IM mitigation action includes deactivating a carrier of the UE, associated with a different radio access technology than the bearer, while the bearer is active.

In some implementations, the IM mitigation action includes changing a channel of the UE to a non-interfering channel.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to determine that an IM interference condition is satisfied for a communication with a UE, where the IM interference condition is based on at least one of: a bearer associated with the UE being active, the UE being associated with a band combination or a channel combination that is associated with IM interference, or receiving an indication of IM interference at the UE; and perform an IM mitigation action based on the IM interference condition being satisfied.

In some implementations, the bearer is a voice call bearer.

In some implementations, the IM mitigation action includes suspending downlink and uplink scheduling on a particular bearer of the UE for a radio access technology associated with the bearer.

In some implementations, the IM mitigation action includes scheduling in accordance with a scheduling pattern that is configured to avoid concurrent transmission on a first radio access technology (RAT) and a second RAT associated with the bearer.

In some implementations, scheduling in accordance with the scheduling pattern is based on a downlink error rate of the UE.

In some implementations, scheduling in accordance with the scheduling pattern is based on a discontinuous reception (DRX) pattern of the UE.

In some implementations, the IM mitigation action includes reducing a maximum transmit power of an uplink grant of the UE.

In some implementations, the uplink grant is associated with a first radio access technology (RAT) and the bearer is associated with a second RAT.

In some implementations, the IM mitigation action includes allocating resource blocks or bandwidth parts for the UE that do not overlap with an IM interference resource.

In some implementations, the IM mitigation action includes changing a secondary cell group channel of the UE to a non-interfering channel.

In some implementations, the IM mitigation action includes releasing a secondary cell group channel of the UE while the bearer is active.

In some implementations, the IM mitigation action includes deactivating a carrier of the UE, associated with a different radio access technology than the bearer, while the bearer is active.

In some implementations, the IM mitigation action includes changing a channel of the UE to a non-interfering channel.

Another innovative aspect of the subject matter described in this disclosure can be implemented in an apparatus for wireless communication. The apparatus may include means for determining that an IM interference condition is satisfied for a communication with a UE, where the IM interference condition is based on at least one of: a bearer associated with the UE being active, the UE being associated with a band combination or a channel combination that is associated with IM interference, or receiving an indication of IM interference at the UE; and means for performing an IM mitigation action based on the IM interference condition being satisfied.

In some implementations, the bearer is a voice call bearer.

In some implementations, the IM mitigation action includes suspending downlink and uplink scheduling on a particular bearer of the UE for a radio access technology associated with the bearer.

In some implementations, the IM mitigation action includes scheduling in accordance with a scheduling pattern that is configured to avoid concurrent transmission on a first radio access technology (RAT) and a second RAT associated with the bearer.

In some implementations, scheduling in accordance with the scheduling pattern is based on a downlink error rate of the UE.

In some implementations, scheduling in accordance with the scheduling pattern is based on a discontinuous reception (DRX) pattern of the UE.

In some implementations, the IM mitigation action includes reducing a maximum transmit power of an uplink grant of the UE.

In some implementations, the uplink grant is associated with a first radio access technology (RAT) and the bearer is associated with a second RAT.

In some implementations, the IM mitigation action includes allocating resource blocks or bandwidth parts for the UE that do not overlap with an IM interference resource.

In some implementations, the IM mitigation action includes changing a secondary cell group channel of the UE to a non-interfering channel.

In some implementations, the IM mitigation action includes releasing a secondary cell group channel of the UE while the bearer is active.

In some implementations, the IM mitigation action includes deactivating a carrier of the UE, associated with a different radio access technology than the bearer, while the bearer is active.

In some implementations, the IM mitigation action includes changing a channel of the UE to a non-interfering channel.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
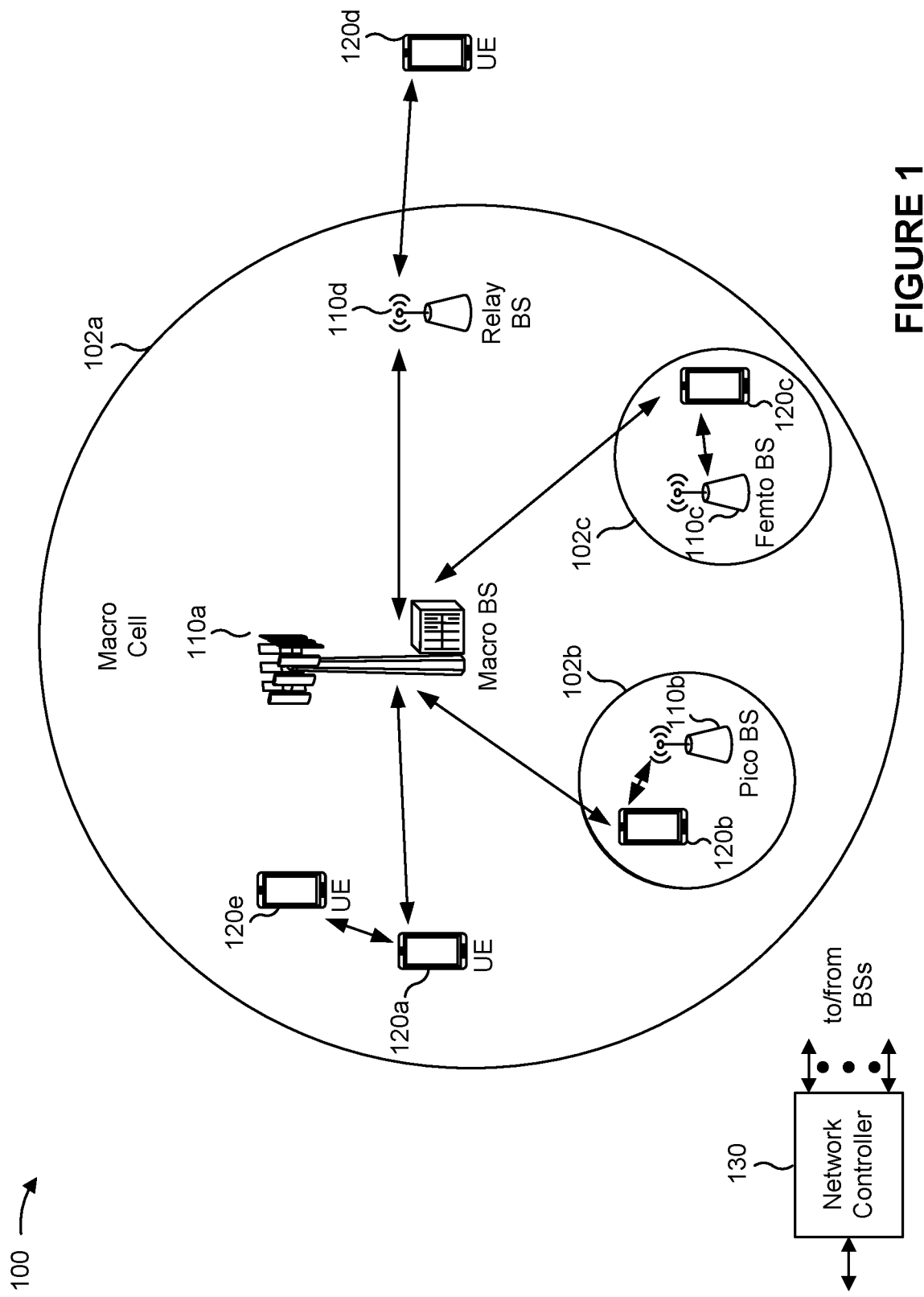
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

An uplink transmission, such as an uplink transmission on multiple radio access technologies (RATs) (such as LTE, NR, or the like), may generate intermodulation (IM) interference falling in a receive band, such as an LTE receive band or an NR receive band. A wireless communication specification (such as the 3GPP NR specification) may provide reference sensitivity exceptions for certain band combinations that are prone to IM interference on the receive band. In some cases, the reference sensitivity exceptions may be conservative. For example, at lower UE transmit powers (such as lower than 20 dBm (decibel-milliwatts) on either the LTE or NR uplink bands), the UE may experience diminished desense in comparison to a full transmit power. As used herein, "desense" refers to a degradation in sensitivity due to noise sources. "Desense" often refers to interference between a transmission and a reception of a particular device, such as between the uplink transmissions of the UE and the downlink receptions of the UE. In another example, for smaller resource allocations (such as less than a full UE bandwidth), the IM interference may not fall in the receive band. In other words, some resource allocations may be associated with IM interference that is not within a frequency or bandwidth used for a downlink reception, so the downlink reception may not experience the IM interference. However, for many UE resource allocations and transmit powers, downlink performance may be impacted even when reference sensitivity exceptions are satisfied. This may be particularly problematic for voice bearers (such as Voice over LTE (VoLTE) bearers or the like) in E-UTRA-NR dual connectivity (EN-DC) or carrier aggregation modes.

Some techniques and apparatuses described herein provide UE-side and network-side mitigation of IM interference. For example, the UE or a base station may detect an IM interference condition, and may perform an IM mitigation action based on detecting the IM interference condition. In some implementations, the UE may reduce an uplink transmit power so that IM interference on the downlink is reduced. Examples of IM mitigation actions for the base station include halting downlink or uplink scheduling on a split bearer or data bearer, avoiding uplink scheduling during a discontinuous reception ON duration, reducing a maximum power control value, restricting resource allocations to a segment or resource pattern that does not cause IM interference with a reception, changing or releasing a secondary cell group channel associated with IM interference, deactivating an interfering component carrier during the call, changing a reception channel to a non-interfering channel, or similar actions, as described in more detail elsewhere herein.

Particular implementations of the subject matter described in this disclosure can be implemented to realize one or more of the following potential advantages. The techniques disclosed herein may reduce IM interference, particularly in dual-RAT or voice call scenarios. Furthermore, coexistence of multiple RATs may be improved by reducing IM interference associated with transmissions on the multiple RATs. Still further, the network-side mitigation mechanisms described herein may eliminate IM interference, thereby improving reception performance.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
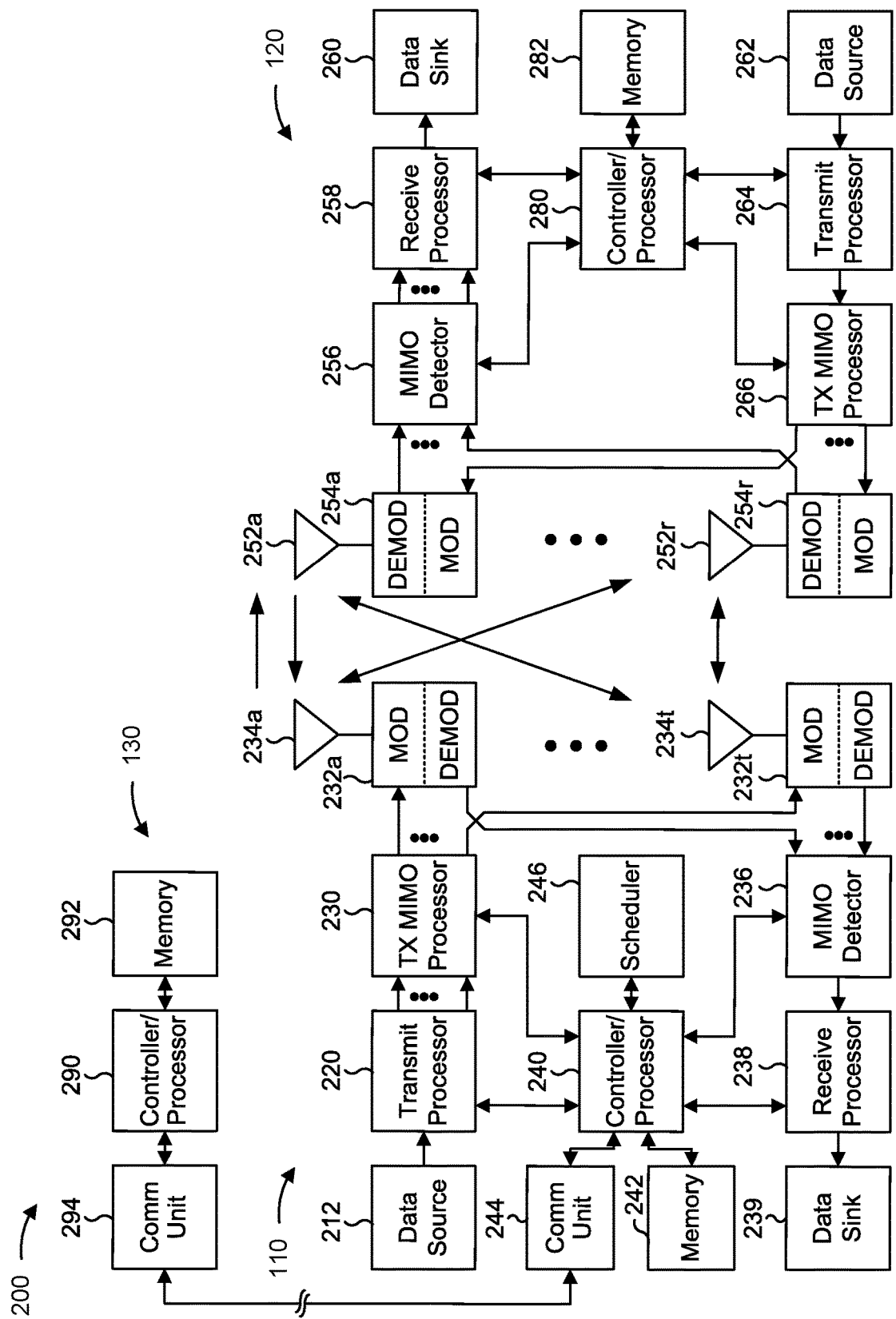
FIG. 2 is a block diagram conceptually illustrating an example of a base station (BS) in communication with a UE in a wireless network.

FIG. 2 is a block diagram conceptually illustrating an example 200 of a base station (BS) 110 (such as the base station 110 depicted in, and described in connection with, FIG. 1) in communication with a UE 120 (such as the UE 120 depicted in, and described in connection with, FIG. 1). In some aspects, base station 110 and UE 120 may respectively be one of the base stations and one of the UEs in wireless network 100 of FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DE-MODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

In some implementations, controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface configured to output, transmit or provide information, and a second interface configured to receive or obtain information. In some cases, the second interface may be an interface between the processing system of the chip or modem and a receiver, such that the UE 120 may receive information or signal inputs, and the information may be passed to the processing system. In some cases, the first interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, controller/processor 240 may be a component of a processing system. A processing system may generally be a system or series of machines or components that receives inputs and processes the inputs to produce a set of outputs (which may be passed to other systems or components of, for example, the BS 110). For example, a processing system of the BS 110 may be a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface configured to output, transmit or provide information, and a second interface configured to receive or obtain information. In some cases, the second interface may be an interface between the processing system of the chip or modem and a receiver, such that the BS 110 may receive information or signal inputs, and the information may be passed to the processing system. In some cases, the second interface may be an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

The controller/processor 240 of base station 110, the controller/processor 280 of UE 120, or any other component(s) of FIG. 2 may perform one or more techniques associated with IM mitigation for inter-RAT communications, as described in more detail elsewhere herein. For example, the controller/processor 240 of base station 110, the controller/processor 280 of UE 120, or any other component(s) (or combinations of components) of FIG. 2 may perform or direct operations of, for example, process 700 of FIG. 7, process 800 of FIG. 8, or other processes as described herein. The memories 242 and 282 may store data and program codes for base station 110 and UE 120, respectively. A scheduler 246 may schedule UEs for data transmission on the downlink, the uplink, or a combination thereof.

Figure 7:
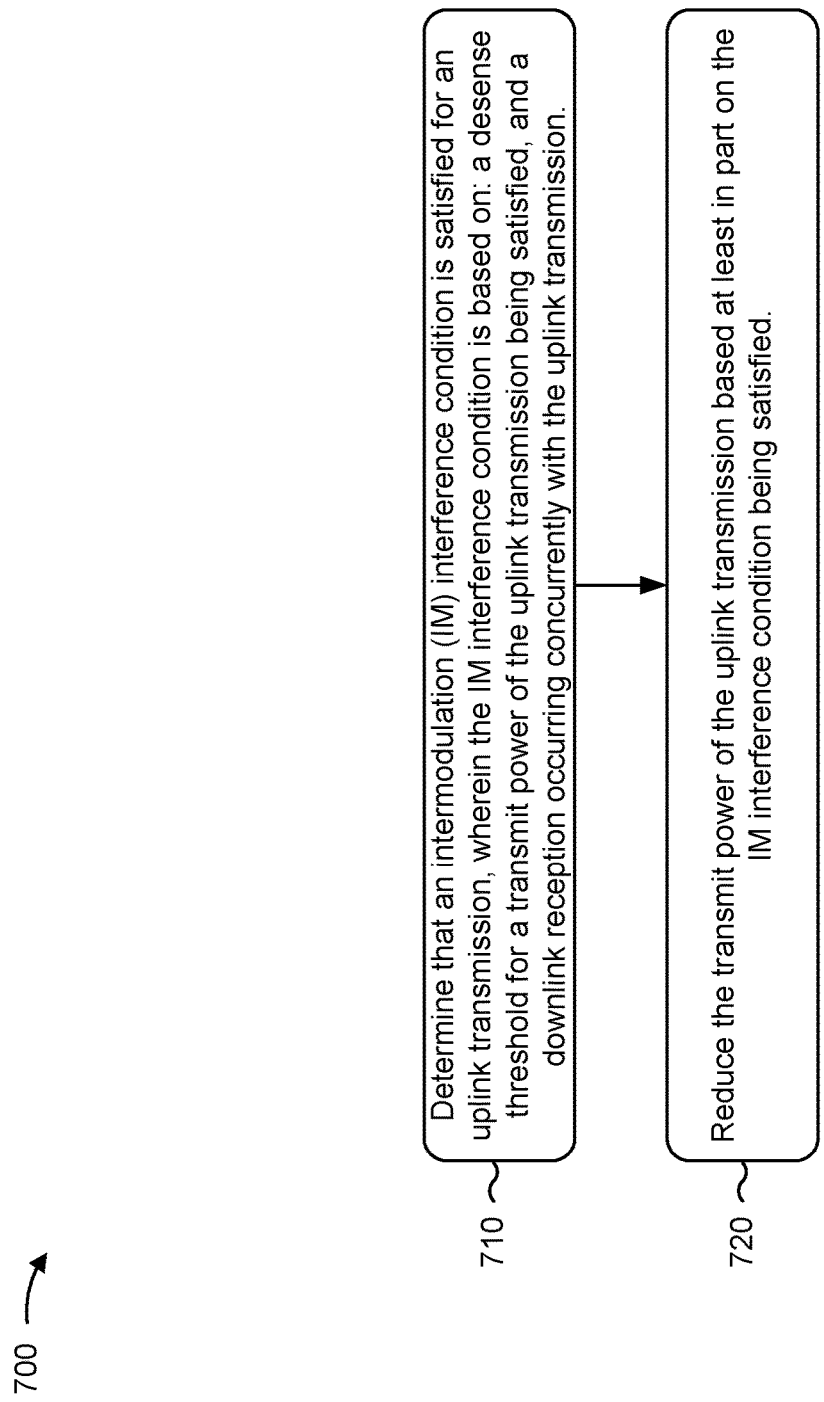
FIG. 7 is a diagram illustrating an example process performed, for example, by a user equipment.

The stored program codes, when executed by the controller/processor 280 or other processors and modules at UE 120, may cause the UE 120 to perform operations described with respect to process 700 of FIG. 7 or other processes as described herein. The stored program codes, when executed by the controller/processor 240 or other processors and modules at base station 110, may cause the base station 110 to perform operations described with respect to process 800 of FIG. 8 or other processes as described herein. A scheduler 246 may schedule UEs for data transmission on the downlink, the uplink, or a combination thereof.

The UE 120 may include means for performing one or more operations described herein, such as the process 700 of FIG. 7 or other processes as described herein. In some aspects, such means may include one or more components of UE 120 described in connection with FIG. 2. The base station 110 may include means for performing one or more operations described herein, such as the process 800 of FIG. 8 or other processes as described herein. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
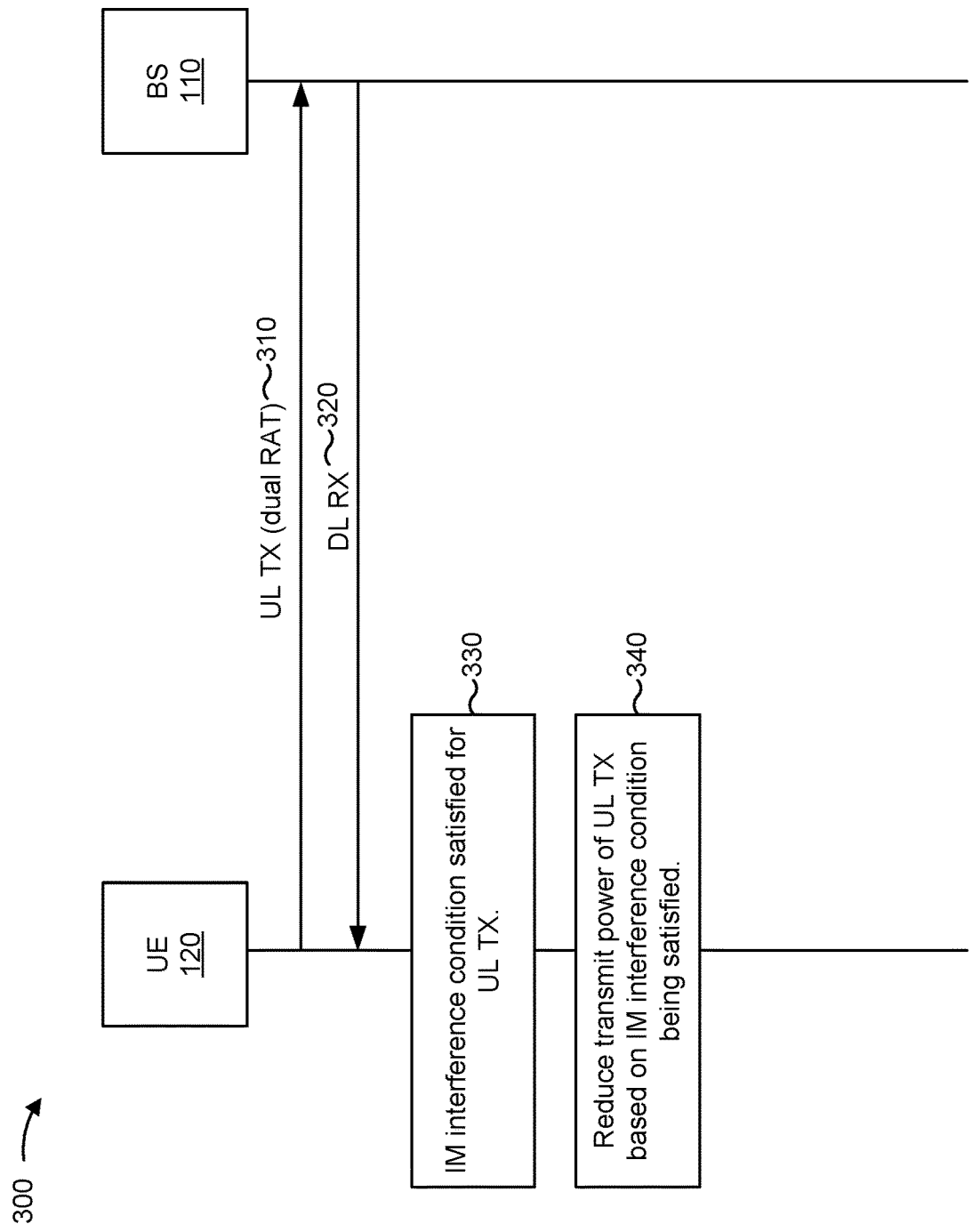
FIG. 3 is a diagram illustrating an example of UE-side mitigation of intermodulation (IM) interference.

FIG. 3 is a diagram illustrating an example 300 of UE-side mitigation of intermodulation (IM) interference. As shown, the example 300 may include a UE 120 and a BS 110 (such as the UE 120 and the base station 110 depicted in, and described in connection with, FIGS. 1 and 2).

As shown by reference number 310, the UE 120 may perform an uplink (UL) transmission (TX). As further shown, the uplink transmission may be a dual RAT transmission. For example, the UE may be associated with an E-UTRA-NR dual connectivity (EN-DC) configuration, a carrier aggregation (CA) configuration, or another dual RAT communication configuration. In some aspects, the two RATs on which the UE 120 performs the uplink transmission may be LTE and NR. In some aspects, the UE 120 may perform one or more transmissions on a single RAT.

As shown by reference number 320, the UE 120 may receive a downlink (DL) reception (shown as DL RX). In some aspects, the DL reception may be associated with IM interference from the UL transmission. For example, a band combination of the UL transmission and the DL reception may be associated with IM interference. In such a case, the UE 120 may experience desense with regard to the DL reception. In some aspects, the downlink reception may be associated with a bearer, such as a voice call bearer (such as a Voice over LTE (VoLTE) bearer) or another bearer.

As shown by reference number 330, the UE 120 may determine that an IM interference condition is satisfied for the UL transmission. In some aspects, the UE 120 may determine that the IM interference condition is satisfied for the DL reception. The IM interference condition may be based on a desense threshold and based on the DL reception occurring concurrently with the UL transmission.

The desense threshold may identify a threshold sensitivity degradation for the downlink reception. For example, the desense threshold may identify a decibel value, a ratio, or a similar value, that indicates a sensitivity degradation for the DL reception. If the sensitivity degradation of the DL reception satisfies the desense threshold, then the UE 120 may determine that the IM interference condition is satisfied (such as in combination with one or more other conditions).

In some aspects, the UE 120 may determine that the IM interference condition is satisfied based at least in part on a dual RAT UL transmission occurring concurrently with the DL reception. For example, the DL reception may be associated with either RAT of the dual RAT UL transmission, or may be associated with a different RAT than either RAT of the dual RAT UL transmission.

In some aspects, the UE 120 may determine that the IM interference condition is satisfied based at least in part on a band combination or a channel combination of the UE 120. For example, certain band combinations or channel combinations may be associated with IM interference. The UE 120 may store information indicating the band combinations or channel combinations that are associated with IM interference. When the UE 120 uses a band combination or channel combination that is identified by the stored information, the UE 120 may determine that the IM interference condition is satisfied (such as in combination with one or more other conditions). As another example, the UE 120 may determine that the IM interference condition is satisfied based on an uplink frequency allocation of the dual RAT UL transmission. For example, the UE 120 may determine whether the uplink frequency allocation of the dual RAT UL transmission is expected to cause IM interference at a frequency associated with the DL reception. If the uplink frequency allocation of the dual RAT UL transmission is expected to cause IM interference at the frequency associated with the DL reception, then UE 120 may determine that the IM interference condition is satisfied.

As shown by reference number 340, the UE 120 may reduce a transmit power of the UL transmission based on the IM condition being satisfied. For example, the UE 120 may apply a backoff to the UL transmission. In some aspects, the UE 120 may reduce the transmit power without modifying a power headroom (PHR) of the UE 120, which may reduce overhead and which may preserve transmit powers of other communications of the UE. In some aspects, the UE 120 may modify the PHR of the UE 120, which may cause the BS 110 to modify a granted UL power of the UE 120.

In some aspects, the UE 120 may determine the reduction of the transmit power so as to cause the desense threshold to no longer be satisfied. For example, the UE 120 may reduce the transmit power as needed to satisfy the desense threshold. In some aspects, the UE 120 may determine the reduction of the transmit power based on a receive power of the DL reception. For example, the UE may determine an average receive power in a time duration or an instantaneous receive power. The receive power may be for an NR reception or an LTE reception. In some aspects, the UE 120 may assume that the DL reception occurs constantly for purposes of determining the reduction of the transmit power, which may conserve resources that would otherwise be used to determine whether the DL reception actually overlaps the UL transmission or the IM interference caused by the UL transmission. In some aspects, the UE 120 may determine whether the DL reception actually overlaps the UL transmission or the IM interference caused by the UL transmission, for example, based on a physical downlink control channel (PDCCH) or a physical downlink shared channel (PDSCH) of the DL reception.

In some aspects, the UE 120 may determine the reduction of the transmit power based on a value of the transmit power. For example, the value of the transmit power may be an instantaneous value of the transmit power. In some aspects, the value of the transmit power may relate to either RAT of the dual RAT configuration of the UE 120.

In some aspects, the UE 120 may determine the reduction of the transmit power based on prioritizing the DL reception or the UL transmission. For example, the UE 120 may prioritize the DL reception if a voice call is ongoing or if a voice call bearer of the UE 120 is active. If the UE 120 prioritizes the UL transmission, then no reduction, or a diminished reduction, may be performed. The reduction of the transmit power may be on either RAT of the dual RAT configuration of the UE 120.

In some aspects, the UE 120 (or the BS 110 described in connection with FIG. 4) may determine the reduction of the transmit power based on an IM power model. For example, the reduction of the transmit power may be greater for a higher IM power value, and may be lower for a lesser IM power value. The IM power model may be trained based on simulations or measurements of IM interference. The IM power model may receive, as input, IM coefficients and corresponding subcarrier frequency values for the dual RAT transmissions of the UE 120. The IM model may output an IM power value (such as a predicted IM power value with regard to the DL reception). In some aspects, the UE 120 or the BS 110 may determine whether the IM interference condition is satisfied based at least in part on the IM model. For example, if the IM power value outputted by the IM model satisfies a threshold, then the UE 120 or the BS 110 may determine that the IM interference condition is satisfied.

In some aspects, the UE 120 may determine the reduction of the transmit power to correspond only to DL receptions. For example, the UE 120 may reduce the transmit power only at times or on resources associated with a DL reception. This may be based on a periodicity of the DL reception, or a VoLTE configuration of the DL reception.

Figure 4:
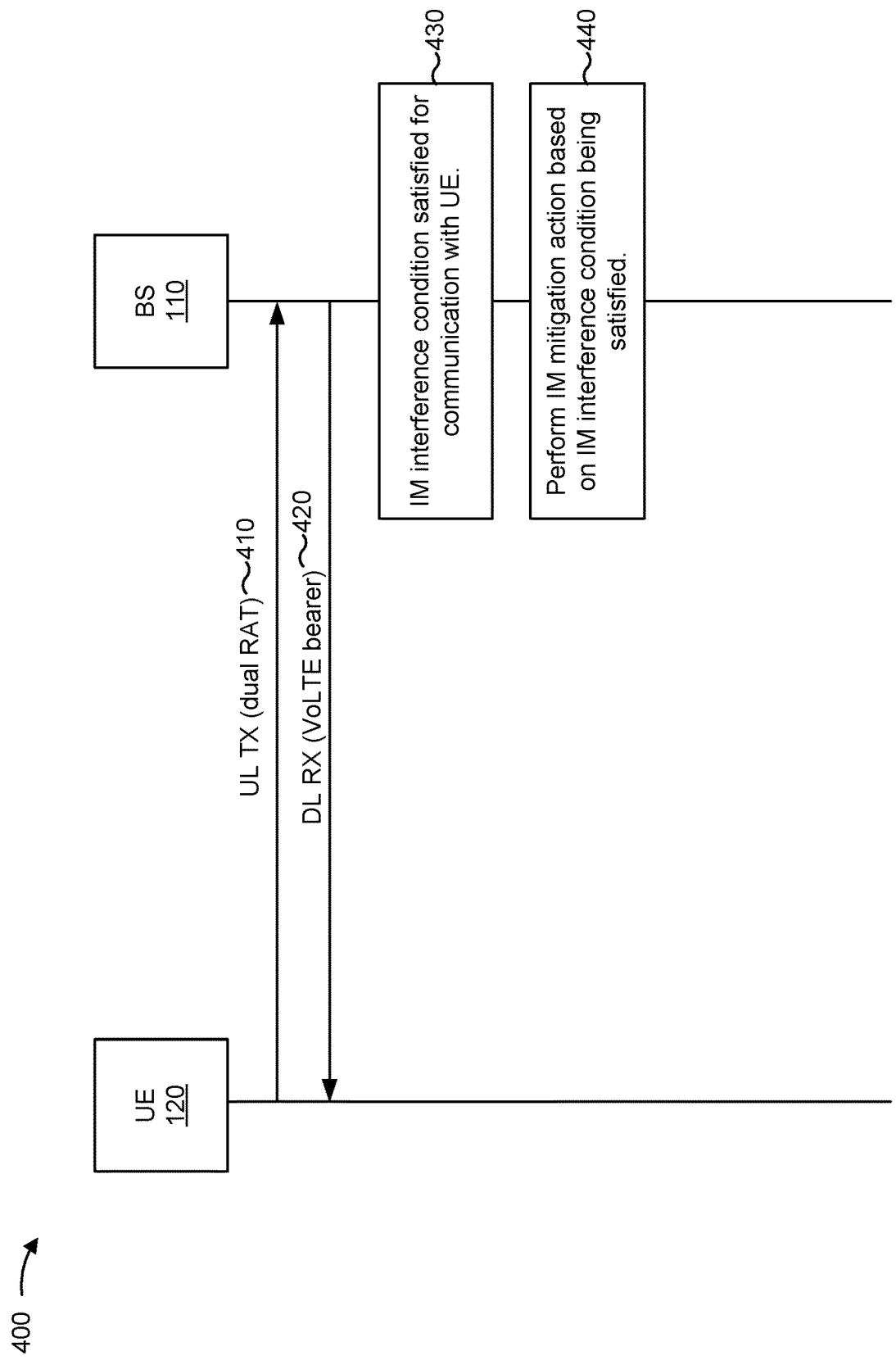
FIG. 4 is a diagram illustrating an example of network-side mitigation of IM interference.

FIG. 4 is a diagram illustrating an example 400 of network-side mitigation of IM interference. As shown, the example 400 includes a BS 110 and a UE 120 (such as the UE 120 depicted in, and described in connection with, FIGS. 1-3).

As shown by reference number 410, the UE 120 may perform a dual RAT UL transmission to the BS 110, such as the dual RAT UL transmission, depicted and described in FIG. 3. As shown by reference number 420, the BS 110 may perform a downlink communication with the UE 120 (shown as DL RX). As further shown, the DL communication may be associated with a VoLTE bearer. In some aspects, the DL communication may be associated with a different type of bearer. In some aspects, the DL communication may be associated with LTE, NR, or a different RAT. In some aspects, the UL transmission may be a single-RAT transmission.

As shown by reference number 430, the BS 110 may determine that an IM interference condition is satisfied for a communication with the UE 120 (such as the UL transmission or the DL transmission). In some aspects, the BS 110 may determine that the IM interference condition is satisfied based on a bearer associated with the UE being active (such as the VoLTE bearer, or a different type of bearer), based on the UE being associated with a band combination or a channel combination that is associated with IM interference, based on receiving an indication of IM interference at the UE 120, or based on a combination thereof. For example, in some aspects, the UE 120 may determine that the IM interference condition is satisfied as described in connection with FIG. 3, and may provide an indication of IM interference at the UE 120. In some aspects, the BS 110 may determine that the IM interference condition is satisfied when the UE 120 is associated with a band combination or channel combination associated with IM interference and the UE 120 is associated with a VoLTE bearer.

As shown by reference number 440, the BS 110 may perform an IM mitigation action based on the IM interference condition being satisfied. In some aspects, the BS 110 may perform multiple IM mitigation actions. For example, the BS 110 may perform multiple IM mitigation actions concurrently. As another example, the BS 110 may perform a first IM mitigation action, may determine whether the first IM mitigation action has mitigated the IM interference (in other words, may determine whether the IM interference condition is still satisfied), may perform a second IM mitigation action when the first IM mitigation action does not sufficiently mitigate the IM interference, and so on.

Figure 5:
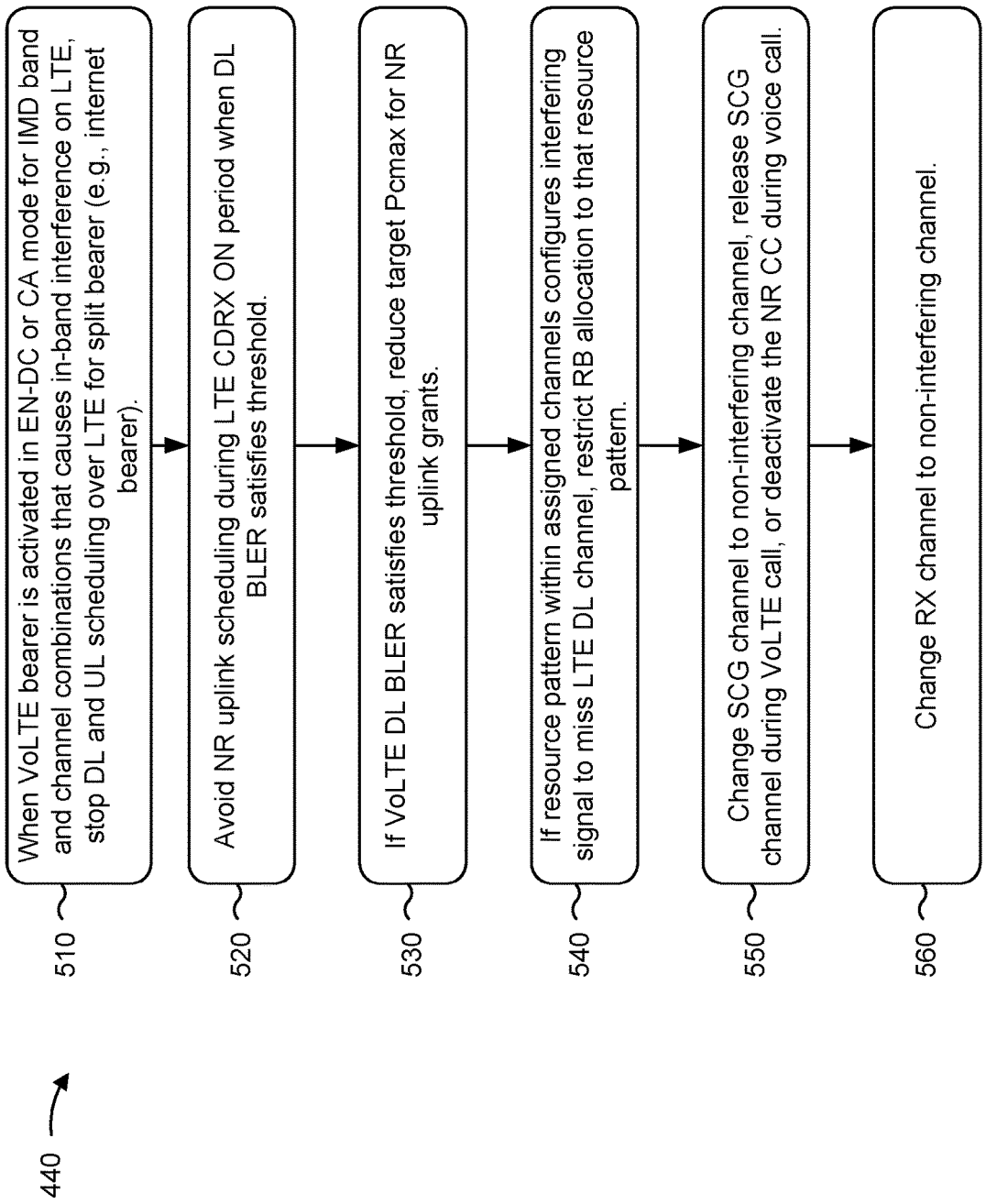
FIG. 5 is a diagram illustrating an example of IM mitigation actions for network-side mitigation of IM interference.

FIG. 5 is a diagram illustrating an example of IM mitigation actions 440 for network-side mitigation of IM interference. While the diagram is a flowchart, it should be understood that the IM mitigation actions 440 need not be performed sequentially in the order shown in FIG. 5. For example, a single IM mitigation action may be performed, or IM mitigation actions may be performed in a different order than the one shown in FIG. 5, or one or more IM mitigation actions shown in FIG. 5 may be skipped. In some implementations, the IM mitigation actions shown in FIG. 5 may be utilized in the order depicted. In such implementations, the order may be considered as an incremental approach to mitigate interference. For example, the first IM mitigation action, shown by reference number 510, may provide less interruption to operation of UE 120 or less overhead than the second IM mitigation action shown by reference number 520, whereas the second IM mitigation action may be more likely to mitigate the IM interference than the first IM mitigation action shown by reference number 510.

A first IM mitigation action is shown by reference number 510. The first IM mitigation action may be used when the UE 120 is in a dual RAT mode, such as an EN-DC mode or a CA mode. As shown, when a VoLTE bearer (or more generally, a bearer) of the UE 120 is activated in the EN-DC mode, and when the band combination or channel combination of the UE is associated with IM interference on the LTE RAT, the BS 110 may halt scheduling (such as downlink scheduling or uplink scheduling) on the LTE RAT for a split bearer (such as an Internet bearer of the UE 120). More generally, when the band combination or channel combination of the UE 120 is associated with IM interference on a given RAT, the BS 110 may halt scheduling on the given RAT for a particular bearer of the UE 120. Thus, the BS 110 may reduce the amount of traffic for the UE 120, thereby reducing IM interference.

A second IM mitigation action is shown by reference number 520. As shown, in some aspects, the BS 110 may perform the second mitigation action when a block error rate (BLER) of the UE 120, such as a DL BLER, satisfies a threshold. In such a case, the BS 110 may avoid NR uplink scheduling during an LTE connected-mode discontinuous reception (C-DRX) ON duration. Thus, the BS 110 may prevent dual-RAT transmission while the UE 120 is to receive the DL reception during the C-DRX ON duration.

A third IM mitigation action is shown by reference number 530. As shown, in some aspects, the BS 110 may perform the third mitigation action when a DL BLER of the UE 120, with regard to a voice call, satisfies a threshold. In this case, the BS 110 may reduce a target maximum transmit power (Pcmax) of the UE 120 for uplink grants on a RAT other than one associated with the voice call. Here, the voice call is associated with LTE and the uplink grants are associated with NR. Thus, the BS 110 may reduce the transmit power of the UE 120, thereby reducing the IM interference.

A fourth IM mitigation action is shown by reference number 540. As shown, in some aspects, the BS 110 may restrict resource allocations (such as resource blocks or bandwidth parts) of the UE 120 to a resource pattern that configures an interfering signal to miss the DL reception of the UE. For example, if a resource pattern configures the IM interference from the UL transmission of the UE 120 not to interfere with the DL reception of the UE 120, the BS 110 may perform scheduling in accordance with the resource pattern. Thus, the BS 110 may mitigate the IM interference by using the resource pattern.

A fifth IM mitigation action is shown by reference number 550. As shown, in some aspects, the BS 110 may change a secondary cell group (SCG) of the UE 120 channel to a non-interfering channel (such as a channel not associated with IM interference or a channel not identified by the information identifying channel combinations or band combinations associated with IM interference). As further shown, in some aspects, the BS 110 may release the SCG channel during a voice call of the UE 120. As further shown, in some aspects, the BS 110 may deactivate a component carrier (CC) of the UE 120 during the voice call. For example, the voice call may be of a first RAT and the CC may be of a second RAT, or both the voice call and the CC may be of a same RAT.

A sixth IM mitigation action is shown by reference number 560. As shown, in some aspects, the BS 110 may change a reception channel of the UE 120 to a non-interfering channel. Thus, the BS 110 may reduce or eliminate IM interference on the reception channel of the BS 110.

Figure 6:
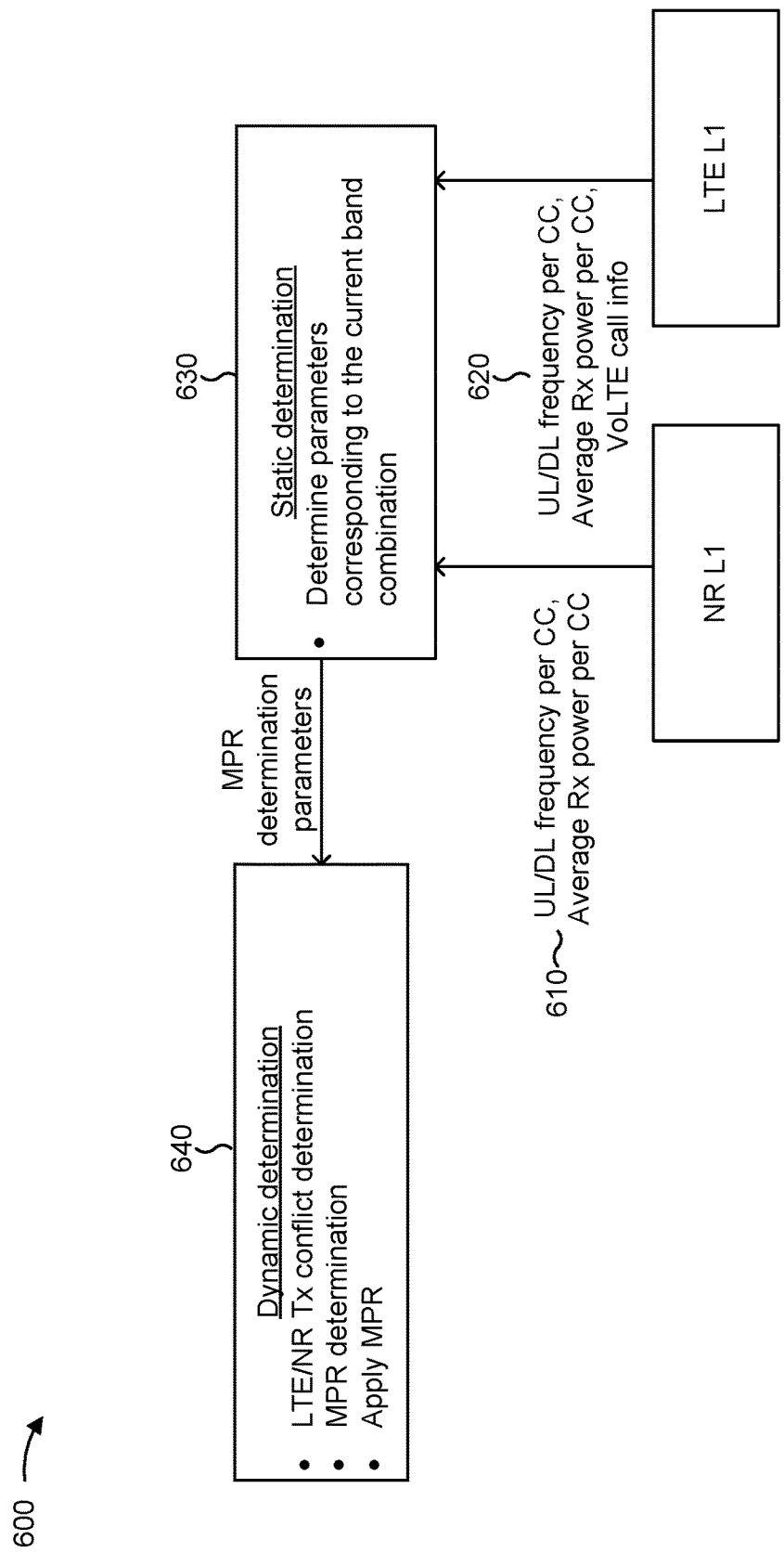
FIG. 6 is a diagram illustrating an example of an algorithm for determination of a maximum power reduction (MPR) for a UE.

FIG. 6 is a diagram illustrating an example of an algorithm 600 for determination of a maximum power reduction (MPR) for a UE 120 (such as the UE 120 depicted in, and described in connection with, FIGS. 1-4). The operations described in connection with FIG. 6 may be performed by the UE 120. As shown by reference number 610, a physical layer (Layer 1, or L1) of the UE 120 associated with NR may provide information for determination of the MPR. This information may include, for example, an uplink or downlink frequency per CC, an average receive power per CC, or similar information. As shown by reference number 620, a physical layer of the UE 120 associated with LTE may provide information for determination of the MPR. This information may include, for example, an uplink or downlink frequency per CC, an average receive power per CC, or voice (VoLTE) call information. These may be referred to as semi-static inputs.

The UE 120 may receive or store other inputs, referred to as static inputs, such as band combinations or channel combinations associated with IM interference, an IM power model, a desense threshold, or a target signal-to-noise ratio for the desense threshold. In some implementations, the UE 120 may receive dynamic inputs, such as a power level of a receive band of the UE 120, transmission scheduling of the UE 120 per slot on one or more RATs, frequency resource scheduling of the UE 120, a transmit power level of the UE 120, or similar information.

As shown by reference number 630, the UE 120 may perform a static determination based on the information received from the physical layer. For example, the UE 120 may determine parameters corresponding to a current band combination or a current carrier combination of the UE 120. The parameters may indicate an IM interference power or a likelihood of IM interference on the band combination or carrier combination of the UE 120.

As shown by reference number 640, the UE 120 may perform a dynamic determination based on the parameters corresponding to the current band combination or the current carrier combination. For example, the UE 120 may determine whether a UL transmission of the UE 120 collides with or is concurrent with the DL reception of the UE, may determine an MPR to mitigate IM interference between the UL transmission and the DL reception, and may apply the MPR to the UL transmission. For example, the dynamic determination may include determining that the MPR is to be applied to the UL transmission based on the desense threshold being satisfied for the UL transmission and based on the UL transmission involving concurrent dual-RAT transmission.

FIG. 7 is a diagram illustrating an example process 700 performed, for example, by a UE. The process 700 is an example where the UE (such as the UE 120 depicted in, and described in connection with, FIGS. 1-6) performs operations associated with IM mitigation for inter-RAT communications.

As shown in FIG. 7, in some aspects, the process 700 may include determining that an IM interference condition is satisfied for an uplink transmission, where the IM interference condition is based on: a desense threshold for a transmit power of the uplink transmission being satisfied, and a downlink reception occurring concurrently with the uplink transmission (block 710). For example, the UE or an interface of the UE (such as using receive processor 258, transmit processor 264, controller/processor 280, or memory 282) may determine that an IM interference condition is satisfied for an uplink transmission, as described herein. In some aspects, the IM interference condition is based on a desense threshold for a transmit power of the uplink transmission being satisfied, and a downlink reception occurring concurrently with the uplink transmission.

As shown in FIG. 7, in some aspects, the process 700 may include reducing the transmit power of the uplink transmission based at least in part on the IM interference condition being satisfied (block 720). For example, the UE or an interface of the UE (such as using receive processor 258, transmit processor 264, controller/processor 280, or memory 282) may reduce the transmit power of the uplink transmission based at least in part on the IM interference condition being satisfied, as described herein.

The process 700 may include additional aspects, such as any single aspect or any combination of aspects described below or in connection with one or more other processes described elsewhere herein.

In a first aspect, the transmit power is reduced by a value configured so that the desense threshold is no longer satisfied after the transmit power is reduced.

In a second aspect, alone or in combination with the first aspect, the uplink transmission is a dual connectivity transmission on at least two radio access technologies (RATs).

In a third aspect, alone or in combination with one or more of the first and second aspects, the at least two RATs include New Radio (NR) and Long Term Evolution (LTE).

In a fourth aspect, alone or in combination with one or more of the first through third aspects, the downlink reception is associated with LTE.

In a fifth aspect, alone or in combination with one or more of the first through fourth aspects, reducing the transmit power of the uplink transmission further includes reducing an NR transmit power of the uplink transmission.

In a sixth aspect, alone or in combination with one or more of the first through fifth aspects, reducing the transmit power of the uplink transmission further includes reducing an LTE transmit power of the uplink transmission.

In a seventh aspect, alone or in combination with one or more of the first through sixth aspects, the downlink reception is associated with NR.

In an eighth aspect, alone or in combination with one or more of the first through seventh aspects, the uplink transmission is a carrier aggregation transmission associated with a single radio access technology.

In a ninth aspect, alone or in combination with one or more of the first through eighth aspects, the uplink transmission is a dual connectivity transmission associated with a single radio access technology.

In a tenth aspect, alone or in combination with one or more of the first through ninth aspects, determining that the IM interference condition is satisfied is based on an average reception power of the downlink reception for a time period.

In an eleventh aspect, alone or in combination with one or more of the first through tenth aspects, determining that the IM interference condition is satisfied is based on an instantaneous reception power of the downlink reception.

In a twelfth aspect, alone or in combination with one or more of the first through eleventh aspects, the downlink reception is associated with a Voice over Long Term Evolution (VoLTE) call.

In a thirteenth aspect, alone or in combination with one or more of the first through twelfth aspects, the downlink reception is assumed to be occurring concurrently with the uplink transmission.

In a fourteenth aspect, alone or in combination with one or more of the first through thirteenth aspects, the downlink reception is determined to be occurring concurrently with the uplink transmission based on scheduling information.

In a fifteenth aspect, alone or in combination with one or more of the first through fourteenth aspects, determining that the IM interference condition is satisfied is based at least in part on a band combination or channel combination of the UE being associated with IM interference.

In a sixteenth aspect, alone or in combination with one or more of the first through fifteenth aspects, determining that the IM interference condition is satisfied is based at least in part on an IM interference power associated with the IM interference that is determined from the uplink transmit power.

In a seventeenth aspect, alone or in combination with one or more of the first through sixteenth aspects, the IM interference power is determined based on a model that is trained based on measurements or simulations of IM interference.

In an eighteenth aspect, alone or in combination with one or more of the first through seventeenth aspects, determining that the IM interference condition is satisfied is based at least in part on a VoLTE call being active.

In a nineteenth aspect, alone or in combination with one or more of the first through eighteenth aspects, the transmit power is reduced without modifying a reported power headroom of the UE.

In a twentieth aspect, alone or in combination with one or more of the first through nineteenth aspects, reducing the transmit power further includes modifying a reported power headroom of the UE.

In a twenty-first aspect, alone or in combination with one or more of the first through twentieth aspects, the desense threshold identifies a threshold sensitivity degradation for the downlink reception.

Although FIG. 7 shows example blocks of process 700, in some aspects, the process 700 may include additional blocks, fewer blocks, different blocks, or differently arranged blocks than those depicted in FIG. 7. Additionally, or alternatively, two or more of the blocks of process 700 may be performed in parallel.

Figure 8:
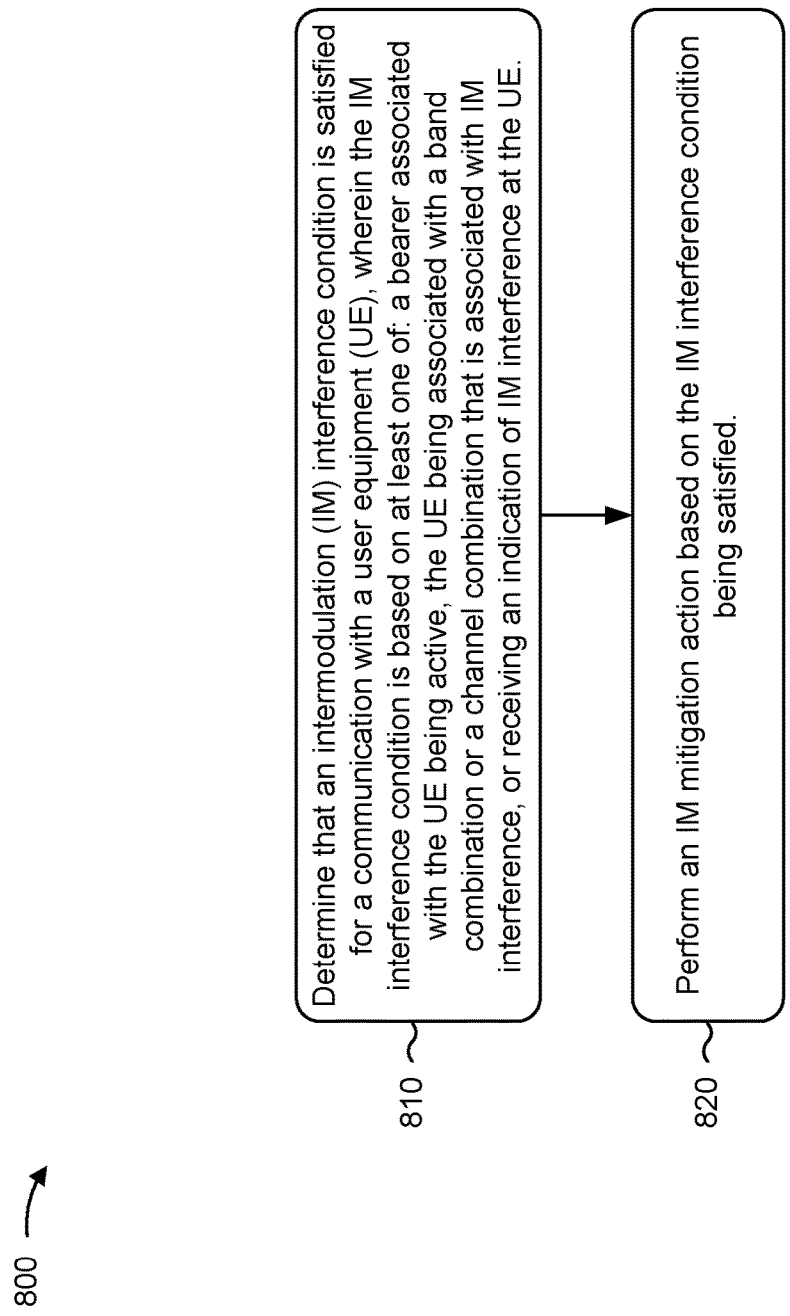
FIG. 8 is a diagram illustrating an example process performed, for example, by a BS.

FIG. 8 is a diagram illustrating an example process 800 performed, for example, by a base station (BS). The process 800 shows an example where the base station (such as the BS 110 depicted in, and described in connection with, FIGS. 1-6) performs operations associated with intermodulation mitigation for inter-RAT communications.

As shown in FIG. 8, in some aspects, the process 800 may include determining that an IM interference condition is satisfied for a communication with a UE, where the IM interference condition is based on at least one of: a bearer associated with the UE being active, the UE being associated with a band combination or a channel combination that is associated with IM interference, or receiving an indication of IM interference at the UE (block 810). For example, the base station or an interface of the base station (such as using controller/processor 240) may determine that an IM interference condition is satisfied for a communication with a UE, as described herein. In some aspects, the IM interference condition is based on at least one of a bearer associated with the UE being active, the UE being associated with a band combination or a channel combination that is associated with IM interference, or receiving an indication of IM interference at the UE.

As shown in FIG. 8, in some aspects, the process 800 may include performing an IM mitigation action based on the IM interference condition being satisfied (block 820). For example, the base station (using controller/processor 240, transmit processor 220, TX MIMO processor 230, MOD 232, or antenna 234) may perform an IM mitigation action based on the IM interference condition being satisfied, as described herein.

Process 800 may include additional aspects, such as any single aspect or any combination of aspects described below or in connection with one or more other processes described elsewhere herein.

In a first aspect, the bearer is a voice call bearer.

In a second aspect, alone or in combination with the first aspect, the IM mitigation action includes suspending downlink and uplink scheduling on a particular bearer of the UE for a radio access technology associated with the bearer.

In a third aspect, alone or in combination with one or more of the first and second aspects, the IM mitigation action includes scheduling in accordance with a scheduling pattern that is configured to avoid concurrent transmission on a first RAT and a second RAT associated with the bearer.

In a fourth aspect, alone or in combination with one or more of the first through third aspects, scheduling in accordance with the scheduling pattern is based at least in part on a downlink error rate of the UE.

In a fifth aspect, alone or in combination with one or more of the first through fourth aspects, scheduling in accordance with the scheduling pattern is based at least in part on a discontinuous reception (DRX) pattern of the UE In a sixth aspect, alone or in combination with one or more of the first through fifth aspects, the IM mitigation action includes reducing a maximum transmit power of an uplink grant of the UE.

In a seventh aspect, alone or in combination with one or more of the first through sixth aspects, the uplink grant is associated with a first radio access technology (RAT) and the bearer is associated with a second RAT.

In an eighth aspect, alone or in combination with one or more of the first through seventh aspects, the IM mitigation action includes allocating resource blocks or bandwidth parts for the UE that do not overlap with an IM interference resource.

In a ninth aspect, alone or in combination with one or more of the first through eighth aspects, the IM mitigation action includes changing a secondary cell group channel of the UE to a non-interfering channel.

In a tenth aspect, alone or in combination with one or more of the first through ninth aspects, the IM mitigation action includes releasing a secondary cell group channel of the UE while the voice call bearer is active.

In an eleventh aspect, alone or in combination with one or more of the first through tenth aspects, the IM mitigation action includes deactivating a carrier of the UE, associated with a different radio access technology than the bearer, while the bearer is active.

In a twelfth aspect, alone or in combination with one or more of the first through eleventh aspects, the IM mitigation action includes changing a channel of the UE to a non-interfering channel.

Although FIG. 8 shows example blocks of process 800, in some aspects, the process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
   determining that an intermodulation (IM) interference condition is satisfied for an uplink transmission,
      wherein the IM interference condition is based on:
         a desense threshold for a transmit power of the uplink transmission being satisfied, and
         a downlink reception occurring concurrently with the uplink transmission; and
   reducing, based on the IM interference condition being satisfied, the transmit power of the uplink transmission by a value configured so that the desense threshold is no longer satisfied after the transmit power of the uplink transmission is reduced.

2. The method of claim 1, wherein the uplink transmission is a dual connectivity transmission on at least two radio access technologies (RATs).

3. The method of claim 2, wherein the at least two RATs include New Radio (NR) and Long Term Evolution (LTE).

4. The method of claim 3, wherein the downlink reception is associated with LTE.

5. The method of claim 1, wherein the uplink transmission is a carrier aggregation transmission associated with a single radio access technology.

6. The method of claim 1, wherein the uplink transmission is a dual connectivity transmission associated with a single radio access technology.

7. The method of claim 1, wherein determining that the IM interference condition is satisfied is based on an average reception power of the downlink reception for a time period or an instantaneous reception power of the downlink reception.

8. The method of claim 1, wherein the downlink reception is assumed to be occurring concurrently with the uplink transmission.

9. The method of claim 1, wherein determining that the IM interference condition is satisfied is based on a band combination or channel combination of the UE being associated with IM interference.

10. The method of claim 1, wherein determining that the IM interference condition is satisfied is based on an IM interference power associated with the IM interference that is determined from the transmit power of the uplink transmission.

11. The method of claim 10, wherein the IM interference power is determined based on a model that is trained based on measurements or simulations of IM interference.

12. The method of claim 1, wherein determining that the IM interference condition is satisfied is based on an uplink frequency resource allocation of the UE.

13. The method of claim 1, wherein the transmit power of the uplink transmission is reduced without modifying a reported power headroom of the UE.

14. A method of wireless communication performed by an apparatus of a base station, comprising:
   determining that an intermodulation (IM) interference condition is satisfied for a communication with a user equipment (UE),
      wherein the IM interference condition is based on at least one of:
         a bearer associated with the UE being active,
         the UE being associated with a band combination or a channel combination that is associated with IM interference, or
         receiving an indication of IM interference at the UE; and
   performing an IM mitigation action based on the IM interference condition being satisfied,
      wherein the IM mitigation action comprises scheduling in accordance with a scheduling pattern that is configured to avoid concurrent transmission on a first radio access technology (RAT) and a second RAT associated with the bearer.

15. The method of claim 14, wherein the bearer is a voice call bearer.

16. The method of claim 14, wherein the IM mitigation action further comprises suspending downlink and uplink scheduling on a particular bearer of the UE for a radio access technology associated with the bearer.

17. The method of claim 14, wherein determining that the IM interference condition is satisfied is based on an uplink frequency resource allocation of the UE.

18. The method of claim 14, wherein the communication with the UE is a carrier aggregation transmission associated with a single radio access technology.

19. An apparatus of a user equipment (UE) for wireless communication, comprising:
   a processing system configured to:
      determine that an intermodulation (IM) interference condition is satisfied for an uplink transmission,
         wherein the IM interference condition is based on:
            a desense threshold for a transmit power of the uplink transmission being satisfied, and
            a downlink reception occurring concurrently with the uplink transmission; and
      reduce, based on the IM interference condition being satisfied, the transmit power of the uplink transmission by a value configured so that the desense threshold is no longer satisfied after the transmit power of the uplink transmission is reduced.

20. The apparatus of claim 19, wherein the uplink transmission is a dual connectivity transmission on at least two radio access technologies (RATs).

21. The apparatus of claim 19, wherein the uplink transmission is a carrier aggregation transmission associated with a single radio access technology.

22. The apparatus of claim 19, wherein the downlink reception is determined to be occurring concurrently with the uplink transmission based on scheduling information.

23. The apparatus of claim 19, wherein determining that the IM interference condition is satisfied is based on a band combination or channel combination of the UE being associated with IM interference.

24. The apparatus of claim 19, wherein determining that the IM interference condition is satisfied is based on an uplink frequency resource allocation of the UE.

25. The apparatus of claim 19, wherein the transmit power the uplink transmission is reduced without modifying a reported power headroom of the UE.

26. The apparatus of claim 19, wherein the uplink transmission is a dual connectivity transmission associated with a single radio access technology.

27. The apparatus of claim 19, wherein determining that the IM interference condition is satisfied is based on an average reception power of the downlink reception for a time period or an instantaneous reception power of the downlink reception.

28. An apparatus of a base station for wireless communication, comprising:
a processing system configured to:
determine that an intermodulation (IM) interference condition is satisfied for a communication with a user equipment (UE),
wherein the IM interference condition is based on at least one of:
a bearer associated with the UE being active,
the UE being associated with a band combination or a channel combination that is associated with IM interference, or
obtaining an indication of IM interference at the UE; and
perform an IM mitigation action based on the IM interference condition being satisfied,
wherein the processing system, to perform the IM mitigation action, is configured to:
schedule in accordance with a scheduling pattern that is configured to avoid concurrent transmission on a first radio access technology (RAT) and a second RAT associated with the bearer.

29. The apparatus of claim 28, wherein the bearer is a voice call bearer.

30. The apparatus of claim 28, wherein the processing system, to perform the IM mitigation action, is further configured to:
suspend downlink and uplink scheduling on a particular bearer of the UE for a radio access technology associated with the bearer.

* * * * *